United States Patent [19]

Kagan

[11] 3,727,644

[45] Apr. 17, 1973

[54] LAY-IN CABLE DUCTING ASSEMBLIES

[76] Inventor: David Kagan, 14 Wenndley Road, Toronto, Ontario, Canada

[22] Filed: Dec. 20, 1971

[21] Appl. No.: 209,570

[52] U.S. Cl. ................. 138/155, 174/101, 138/157, 138/92
[51] Int. Cl. ............................................. F16l 9/18
[58] Field of Search ................... 138/92, 116, 117, 138/157, 155, 162; 220/3.8; 174/101, 68 C

[56] References Cited

UNITED STATES PATENTS

| | | | |
|---|---|---|---|
| 2,917,083 | 12/1959 | Duvall | 138/159 |
| 3,243,503 | 3/1966 | Burley | 138/162 X |
| 3,403,220 | 9/1968 | Riedel | 174/101 |
| 3,551,584 | 12/1970 | Rose | 174/49 |
| 3,570,546 | 3/1971 | Jackson | 138/155 |
| 3,697,667 | 10/1972 | Pollak | 138/157 |

*Primary Examiner*—Herbert F. Ross
*Attorney*—Cecil C. Kent

[57] ABSTRACT

A lay-in cable channel section has a gate as one of its lateral walls which is hinged along the bottom edge, the novel hinge providing the gate with enough strength to act as a supporting platform for materials alongside the cableway. The hinge is also designed so as to permit the gate to stay vertically closed when raised. The cable channel sections are united by coupling sections of similar cross-section but these have suspended gates so seal off any static gap. Above the interior cableway is an open cableway. Novel hangers permit the channel sections to be suspended in side-by-side pairs. A section can be simply lifted out of the hanger and by a reverse movement returned to be positively held by way of upper and lower flanges.

8 Claims, 3 Drawing Figures

PATENTED APR 17 1973
3,727,644
SHEET 1 OF 2
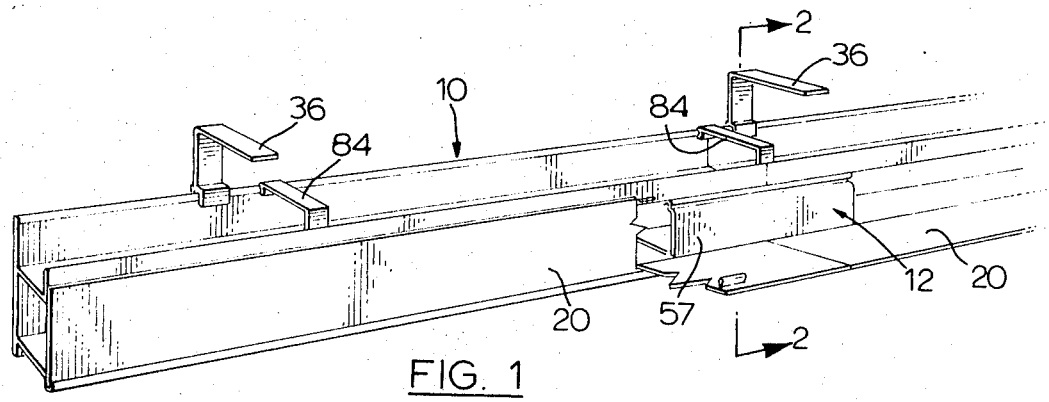
FIG. 1
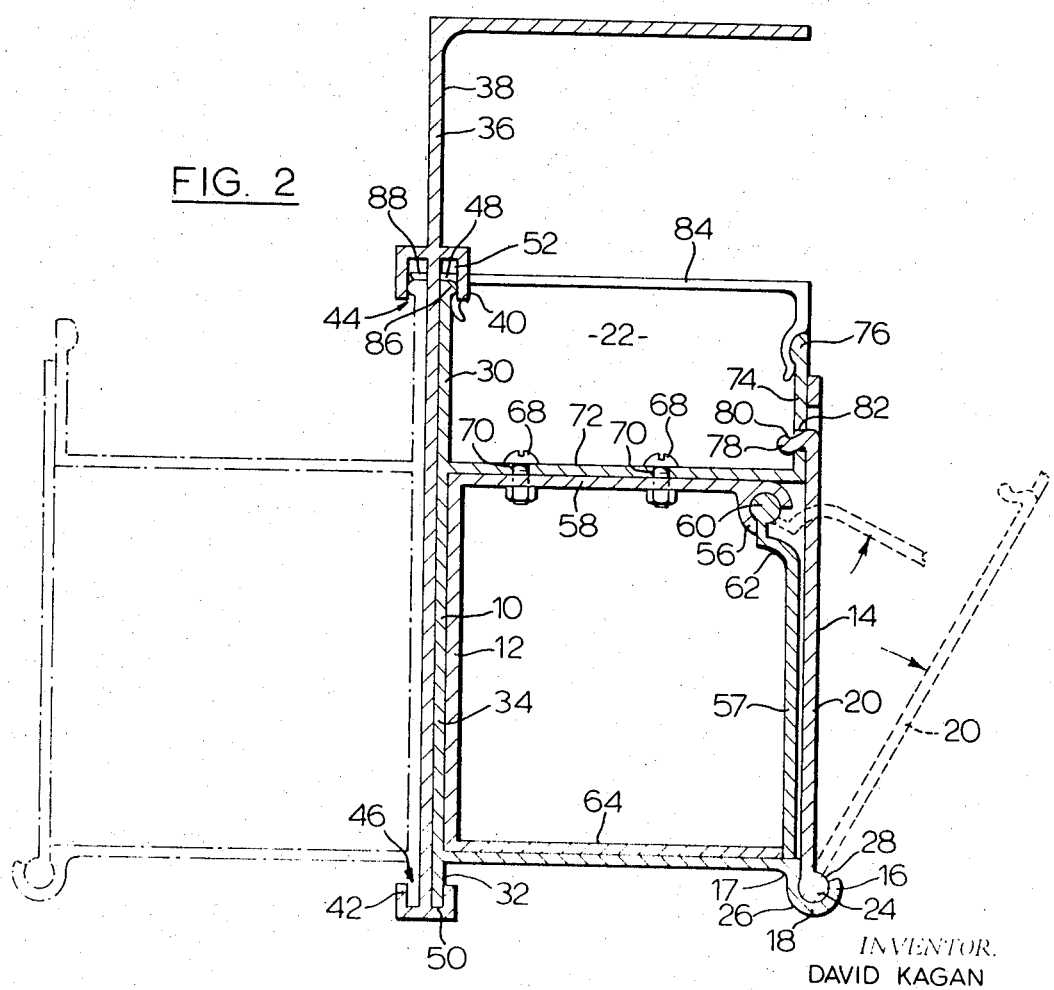
FIG. 2
INVENTOR.
DAVID KAGAN
BY 
ATTY.

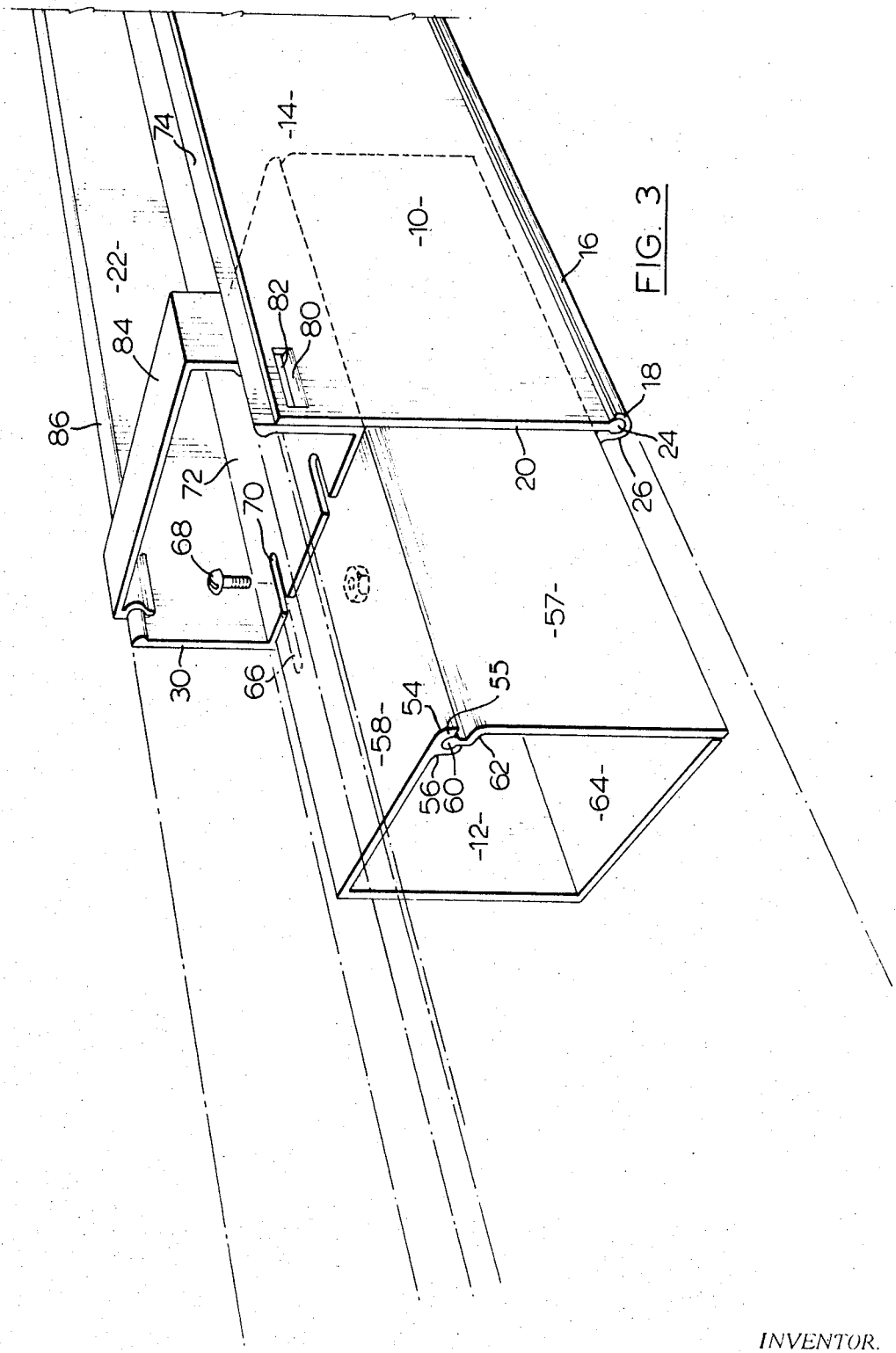

3,727,644

LAY-IN CABLE DUCTING ASSEMBLIES

FIELD OF THE INVENTION

The invention relates to ducting for electrical cables of the kind wherein the cable is moved sideways a short distance, at right angles to its longitudinal axis after having been unwound into linear condition whereby the effort required in end pulling is eliminated and also the high strength ducting capable of withstanding the strains of pulling. In many instances it is very difficult to lay cable by endwise threading and pushing and pulling activities. Furthermore it is difficult to gain access to cables which are contained in ducting adapted to accommodate cables which have been fed in through the end.

DESCRIPTION OF THE PRIOR ART

Lay-in ducting is not new. Various forms are disclosed in the following U.S. Patents: No. 3,403,220 of Sept. 24, 1968 to Riedle et al., No. 3,347,275 of Oct. 17, 1967 to Murphy, No. 3,338,599 of Aug. 29, 1967 to Hallman, No. 3,554,236 to Rhodes, No. 3,120,574 of Feb. 4, 1964 to Wesson and No. 3,551,584 of Dec. 29, 1970 to Rose. The present invention includes a coupling channel for use between each cable channel section. This is not broadly speaking new being shown in Hallman supra. The present invention also includes gate means constituting one lateral wall and hinged along the bottom edge to the channel section. A single inner piece of wall portion hinged along its bottom edge and covered by an outer panel is also shown in Hallman. Nevertheless the Hallman coupling channel and the Hallman gate portion are both for different purposes and would not accomplish what applicant accomplishes by his correspondingly named parts. Thus the Hallman coupling channel is not sealed against static. Neither is his wall portion capable of supporting materials during the operation of laying-in and it does not include hinge means tending to retain the gate closed against the channel section when simply raised into vertical closed position. Neither is the Hallman gate removable.

BRIEF STATEMENT OF NOVELTY AND ADVANTAGES

The principal novelty of the invention resides in the provision of rectangular lay-in cables channel section having one lateral wall in the form of gate means which are the sole agency enclosing that side. The gate panel of the said gate means extends for the entire length of the section and is combined with novel hinge means which do not project outwardly in an undesirable way and which do not subtract from the available space within the section and yet which permit the gate panel to be rotated about the lower edge thereof so as, in the most fully open position to constitute a working surface, platform, table or retaining portion for materials such as cable being laid in or other accessory materials. When it is desired to close the gate means, the aforesaid novel hinge means combine with the panel to permit the latter to be simply raised into the vertical at which position it rests lightly against the ducting section and there remains closed, if desired without any other agency although, for certain purposes use is made of a simple locking means which will in due course be described.

Another advantage resides in the provision of a cable channel section which includes an open topped cableway overlying the cable section below the two being integral. Another advantage resides in providing for removability of the aforesaid gate panel by horizontal endwise movement. Still another advantage resides in the provision of a coupling channel having gate means constituting one lateral side thereof (the side corresponding to that of the channel section) which is hinged at the upper edge, the roof of the coupling channel terminating at said upper edge in a roll form such as will close the gap completely between adjacent channel sections and effectively prevent any jumping of static through an undesirable gap. Still another advantage resides in the provision of novel hanger means by the use of which the aforesaid channel sections may be conveniently placed in parallel and side-by-side on either side of said hanger means, being extremely easily removable therefrom and as easily reinsertable thereto or as will hereinafter be described.

With the foregoing in view, and such other or further purposes, advantages or novel features as may become apparent from consideration of this disclosure and specification, the present invention consists of the inventive concept comprised, embodied, embraced, or included in any method, process, construction, composition, arrangement or combination of parts, or new use of any of the foregoing which may herein be exemplified in one or more specific embodiments of such concept, reference being had to the accompanying drawings in which:

FIG. 1 is a general perspective representation of two contiguous lay-in cable channel sections showing a coupling channel between them with certain parts fragmented for clarity.

FIG. 2 is a section on the line 2—2 of FIG. 1.

FIG. 3 is an enlarged perspective representation of the end of one cable channel section showing its relationship with the associated coupling channel.

In the drawings, like characters of reference designate similar parts in the several figures.

PRELIMINARY DESCRIPTION

Initially describing the subject-matter hereof in terms generally consonant with those by which the same has been defined and claimed as an invention, a lay-in cable channel section collectively designated 10 of generally rectangular transverse cross-section is combined with a coupling channel 12 of substantially complementary transverse cross-section for uniting two such cable channel sections, said channel section having elongated gate means collectively designated 14 for closing one lateral side of the assembly, hinge means collectively designated 16 connected to the channel section along its lower edge 17, and means collectively designated 18 for restricting the opening of the panel 20 of said gate means to an arc of between not substantially less than 45° and not substantially more than 90° from the approximate vertical, for the purpose of supporting materials upon the said gate panel during the laying-in of cable.

The invention also includes an open-topped cableway generally designated 22 overlying cable channel section 10, the two being integral. The gate panel 20 is removable by endwise sliding movement as will best be discerned from an inspection of FIG. 3 from which Figure and FIG. 2 it will also be seen that the gate means include an elongated cylindrical hinge pin 24 integral with gate panel 20, and an elongated hinge roll 26 of semi-cylindrical transverse cross-sectional configuration in which the hinge pin resides and rotates, the said roll having an opening 28 extending for the length of the roll through which gate panel 20 extends, the width of the opening being contained in an arc of not substantially less than 45° or substantially more than 90° next below the horizontal axial plane of the roll. In fact the arc 28 is of approximately the width which has been illustrated and in virtue of which, when open, the gate panel 20 may lie sub-horizontal.

The hinge means 16 are so related to the gate means 14 as to cause the gate panel to remain in substantially vertical closed position against the channel section upon being raised into such substantially vertical position in virtue of the lower edge of the gate panel being slightly offset from the axial planes of the pin 24 so as to import a tendency toward remaining closed as aforesaid when raised.

The invention also includes upwardly and downwardly projecting flanges each collectively designated 30 and 32 on the upper and lower portions respectively of the lateral wall 34 thereof opposite the aforesaid gate panel, and hanger means collectively designated 36, said hanger means at least including a suspension bar 38 and downwardly and upwardly opening hook means collectively designated 40 and 42 fixed on the bar engageable with the said upper and lower flanges respectively. The distance between the entrances 44 and 46 to said hooks is slightly less than the distance between the distal edges 48 and 50 of the flanges 30 and 32. As a result the channel section 10 can be lifted out of the hook means 42 for disengagement therewith as will upon brief inspection of FIG. 2 immediately be apparent. At that time end 48 will move upwardly into the space 52. Then, by a slight canting action the channel section 10 can be lowered clear. On the other hand it is apparent that when the cable channel sections are in situ as illustrated in FIG. 2 they are securely held and of course re-insertion is accomplished by just the opposite steps from the aforesaid. In other words, the upper flange 48 is first inserted and pushed upwardly. Then the wall 34 is moved against the hanger 36 and the flange 32 dropped into the space provided in hook means 42.

DETAILED DESCRIPTION

The coupling channel 12 is characterized by being provided with gate means collectively designated 54 including a gate panel 57 in underlapping relationship with the gate means 14, the hinge means 56 being at the upper horizontal edge of the coupling channel gate. The hinge means 56 at least include a continuous semi-cylindrical hinge roll 55 integral with the roof 58 of the coupling channel, and a hinge pin means 60 integral with the gate panel for insertion into the said hinge roll.

The hinge roll 55 inclines forwardly and downwardly over the hinge pin 60 integral with the roof 58 so as to constitute an eave for the said roof. It thus provides, when bridging two adjacent cable channel sections 10 a continuous solid interrupter of any possible static which might exist were there a longitudinal gap in that vicinity. It will be observed that the gate panel 57 curves outwardly and downwardly at 62 thus providing a snug interfacing relationship with gate panel 20, the lower edge of panel 57 abutting the coupling floor 64 upon the front vertical edge of the latter.

The coupling 12 is provided with the longitudinal slots 66 for the reception of the fastening assemblies 68. Registering open-ended slots 70 are provided in the roof 72 of section 10 to secure the section and the coupling together. It will be observed that a flange 74 having an upset apical edge 76 extends vertically from the edge of floor 72 which is opposite to that upwardly from which flange 30 extends. Flanges 30 and 74 constitute the walls of the aforesaid open-topped cableway 22. Gate panel 20 overlies flange 74 effectively further to enclose channel section 10 electrically. Under circumstances in which it is desirable to lock gate panel 20 to the channel section 10, the fastening assemblies 78 may be resorted to. These consist of a curved tongue piece 80 struck inwardly from the upper edge of gate panel 20 as in FIG. 3 or else struck inwardly from the surrounding metal as alternatively depicted in FIG. 2. In either case, the tongue is adapted to extend through slot 82 formed in flange 74 and it is to be understood that the aforesaid fastening assemblies will be provided upon gate panel 20 at desired intervals.

When the fastening means 78 are resorted to it of course not necessary to provide the offset to the pin 24 relative to the lower edge of the gate panel 20. However, it will be appreciated that forming the tongue 80 is a stamping operation subsequent to the extrusion of the gate panel and hinge pin 20 and 24. Hence the same extrusion can be employed in both circumstances.

At intervals for the purpose of snugly tying in the contents of the overlying cable section 22, the transverse tie clips 84 are provided which conveniently engage resiliently the upsets 76 and 86 with the portion 88 overlying the upset 86.

Various modifications may be constructed or performed within the scope of the inventive concept disclosed. Therefore what has been set forth is intended to illustrate such concept and is not for the purpose of limiting protection to any herein particularly described embodiment thereof.

What is claimed is:

1. In combination, a lay-in cable channel section of generally rectangular transverse cross-section and a coupling channel of substantially complementary transverse cross-section for uniting two such channel sections, said channel section having an elongated gate means for closing one lateral side of said channel section, hinge means connected to said channel section along its lower edge and means for restricting the opening of the panel of said gate means to an arc of between not substantially less than 45° and not substantially more than 90° from the approximate vertical for the purpose of supporting materials upon said gate panel during the laying-in of cable, an open-topped cableway overlying said cable section, said cable section and cable-way being integral, said gate means being removable from said channel section by endwise sliding movement.

2. The invention according to claim 1 in which said gate means at least include an elongated cylindrical hinge-pin integral with said gate panel, said means for restricting the opening of said gate panel at least including an elongated hinge roll of semi-cylindrical transverse crossnsectional configuration for said hingepin, said pin residing in said roll, said roll having an opening parallel with said roll extending for the length of said roll through which said gate panel extends, the width of said opening being contained in an arc of not substantially less than 45° or substantially more than 90° next below the horizontal axial plane of said roll.

3. The invention according to claim 1 in which said hinge means are so related to said gate means as to cause said gate panel to remain in substantially vertical closed position against said channel section upon being raised into such substantially vertical position.

4. The invention according to claim 2 in which said pin is secured integrally to the lower edge of said gate panel offset from the axial planes of said pin so as to import a tendency to said gate panel of remaining in closed position when raised into the substantially vertical with said panel contacting said channel section.

5. The invention according to claim 2 which includes an open-topped cable-way overlying said cable section, said cable section and cable-way being integral.

6. The invention according to claim 1 in which said channel section includes upwardly and downwardly projecting flanges on the upper and lower portions respectively of the lateral wall thereof opposite said gate panel, and hanger means, said hanger means at least including a suspension bar and downwardly and upwardly opening hook means fixed on said bar engageable with said upper and lower flanges respectively, the distance between the entrances to said hooks being slightly less than the distance between the distal edges of said flanges whereby said channel section can be lifted out of said hook means for disengagement therewith and yet be held between both said upwardly and downwardly opening hook means while in situ.

7. The invention according to claim 1 in which said coupling channel includes gate means including a gate panel in underlapping relationship with said channel section gate means, hinge means for said coupling channel gate means at the upper horizontal edge of said coupling channel gate panel, said hinge means at least including a continuous semi-cylindrical roll integral with the roof of said coupling channel and hinge pin means integral with said gate panel receivable into said hinge roll.

8. The invention according to claim 2 in which said coupling channel includes gate means including a gate panel in underlapping relationship with said channel section gate means, hinge means for said coupling channel gate means at the upper horizontal edge of said coupling channel gate panel, said hinge means at least including a continuous semi-cylindrical roll integral with the roof of said coupling channel and hinge pin means integral with said gate panel receivable into said hinge roll, an open-topped cable-way overlying said cable section, said cable section and cable-way being integral, said channel section gate means being removable from said channel section by endwise sliding movement.

* * * * *